(12) United States Patent
Milde, Jr.

(10) Patent No.: US 7,461,811 B2
(45) Date of Patent: Dec. 9, 2008

(54) VTOL PERSONAL AIRCRAFT

(76) Inventor: Karl F. Milde, Jr., 752 Union Valley Rd., Mahopac, NY (US) 10541

(*) Notice: Subject to any disclaimer, the term of this patent is extended or adjusted under 35 U.S.C. 154(b) by 73 days.

(21) Appl. No.: 11/114,836

(22) Filed: Apr. 26, 2005

(65) Prior Publication Data

US 2006/0054736 A1    Mar. 16, 2006

Related U.S. Application Data

(63) Continuation-in-part of application No. 10/242,036, filed on Sep. 11, 2002, now Pat. No. 6,886,776.

(60) Provisional application No. 60/661,554, filed on Mar. 14, 2005.

(51) Int. Cl.
*B64C 27/22* (2006.01)

(52) U.S. Cl. .......................... 244/9; 244/19; 244/12.3; 244/12.5; 244/23 B

(58) Field of Classification Search ................ 244/12.3, 244/12.4, 12.5, 23 A, 23 B, 23 R, 9, 19
See application file for complete search history.

(56) References Cited

U.S. PATENT DOCUMENTS

| | | | | |
|---|---|---|---|---|
| 1,533,713 A | * | 4/1925 | Tatay | 244/9 |
| 2,164,721 A | * | 7/1939 | Price | 244/208 |
| 4,194,707 A | * | 3/1980 | Sharpe | 244/9 |
| 4,538,779 A | * | 9/1985 | Goldstein | 244/87 |
| 5,265,827 A | * | 11/1993 | Gerhardt | 244/20 |
| 5,950,559 A | * | 9/1999 | Klem | 114/272 |
| 6,231,004 B1 | * | 5/2001 | Peebles | 244/10 |
| 6,527,229 B1 | * | 3/2003 | Peebles | 244/204.1 |

* cited by examiner

*Primary Examiner*—J. Woodrow Eldred
(74) *Attorney, Agent, or Firm*—Milde & Hoffberg, LLP

(57) ABSTRACT

An STOL or VTOL winged aircraft comprises a fuselage and a fixed wing attached to the fuselage and extending outward from the two lateral sides thereof, forming one wing component extending outward from one side of the fuselage and a second wing component extending outward from the opposite side of the fuselage. At least one "thruster" is disposed in each wing component to provide vertical lift to the aircraft when the aircraft is stationary or moving forward only slowly. The thruster includes a shaft mounted for rotation in the respective wing component and extending substantially parallel to the wing axis and a plurality of fan blades attached to the shaft for movement of air. A shroud is preferably arranged in each wing component, adjacent to the fan blades, for directing the airflow downward or rearward.

20 Claims, 8 Drawing Sheets

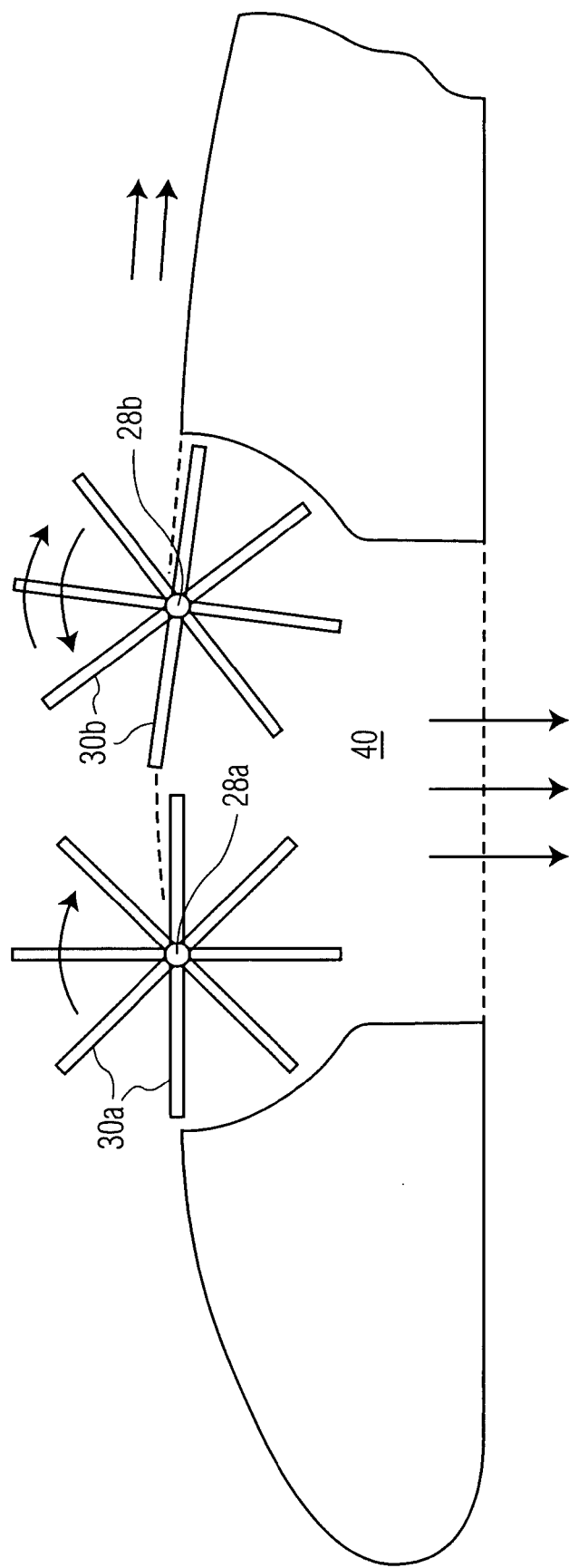

VTOL PERSONAL AIRCRAFT

CROSS REFERENCE TO RELATED APPLICATION

This application is a continuation-in-part of U.S. patent application Ser. No. 10/242,036, filed Sep. 11, 2002, now U.S. Pat. No. 6,886,776 now allowed, and claims priority from U.S. Provisional Patent Application Ser. No. 60/661,554, filed Mar. 14, 2005.

BACKGROUND OF THE INVENTION

The present invention relates to a small, affordable short take-off and landing (STOL) and/or vertical take-off and landing (VTOL) aircraft called a "Personal Aircraft", or "PAC" for short. The present invention relates efficient and relatively simple means for producing vertical, upward thrust beneath the wing(s) of the aircraft.

A typical winged aircraft comprises an elongate fuselage forming a passenger compartment for pilot and passenger(s). The fuselage has two lateral sides and is arranged along the longitudinal axis of the aircraft that is aligned with the direction of forward motion.

The aircraft has one or more elongate fixed wings which are attached to the fuselage and extend outward from the two lateral sides thereof. The wing(s) have a leading edge and a trailing edge and a longitudinal wing axis that extends perpendicular to the aforementioned longitudinal axis of the aircraft. The center of gravity of the aircraft is located in a region between the leading edge and the trailing edge of the wing(s). Each wing has a first wing component extending outward on one side of the fuselage and a second wing component extending outward on the opposite side of the fuselage.

The aircraft has a prime mover with a propeller or other means for propelling it forward so that air flows over the wings and they provide lift. The aircraft also has at least one "thruster" disposed in the wing component on each side of the aircraft for providing additional vertical lift, especially when the aircraft is moving forward slowly or not moving at all.

An aircraft of this type is more fully disclosed in the aforementioned U.S. patent application Ser. No. 10/242,036, now allowed, the disclosure of which is incorporated herein by reference.

SUMMARY OF THE INVENTION

A principal object of the present invention is to simplify the mechanism for providing vertical lift to a winged aircraft when in the STOL or VTOL mode.

A further object of the present invention is to enhance the vertical lift produced by the wing(s) of an aircraft when the aircraft is flying slowly.

These objects, as well as further objects which will become apparent from the discussion that follows, are achieved, in accordance with the present invention, by providing a thruster in a wing component on each side of the aircraft, which thruster comprises:

(1) at least one shaft mounted for rotation in the respective wing component and extending substantially parallel to the wing axis; and (2) a plurality of fan blades attached to each shaft for movement of air upon rotation of the respective shaft. The shafts in the wing components are rotated by one or more prime movers, preferably arranged in the fuselage.

Preferably, the fan blades which are attached to each shaft, are elongate and extend substantially parallel to the shaft. Preferably also, a shroud is arranged in each respective wing components, adjacent the fan blades, for directing the air moved by the fan blades. The shroud may be arranged parallel to the upper surface of the wing, above the fan blade, or substantially perpendicular to the upper surface behind the fan blades. The shroud is preferably moveable for directing air either rearward over the upper surface of the wing component, to increase the speed of the air over this surface, or downward to provide vertical lift.

In an advantageous embodiment of the present invention, the shaft in each respective wing component is moveable in the vertical direction between a first position, in which the fan blades protrude upward from the upper surface of the wing component, and second position in which the fan blades are substantially contained between the upper surface and the lower surface of the wing component.

The thruster can comprise either one shaft, with an associated plurality of fan blades, or two shafts, each with a plurality to blades, mounted for rotation in each wing component substantially parallel to the wing axis and to each other. The two shafts are preferably driven in opposite directions by a common prime mover, either directing air downward in the space between them or directing air downward in a Roots-type blower configuration.

The shafts can also be rotated in the same direction so that both fans operate to move the air rapidly over the upper surface of the wing component.

When the thruster operates to increase the speed of the air moving over the upper surfaces of the wing components, it decreases the pressure at the surface in accordance with Bernoulli's principle, thereby increasing the lift of the wing.

BRIEF DESCRIPTION OF THE PREFERRED EMBODIMENT

Figure 1:
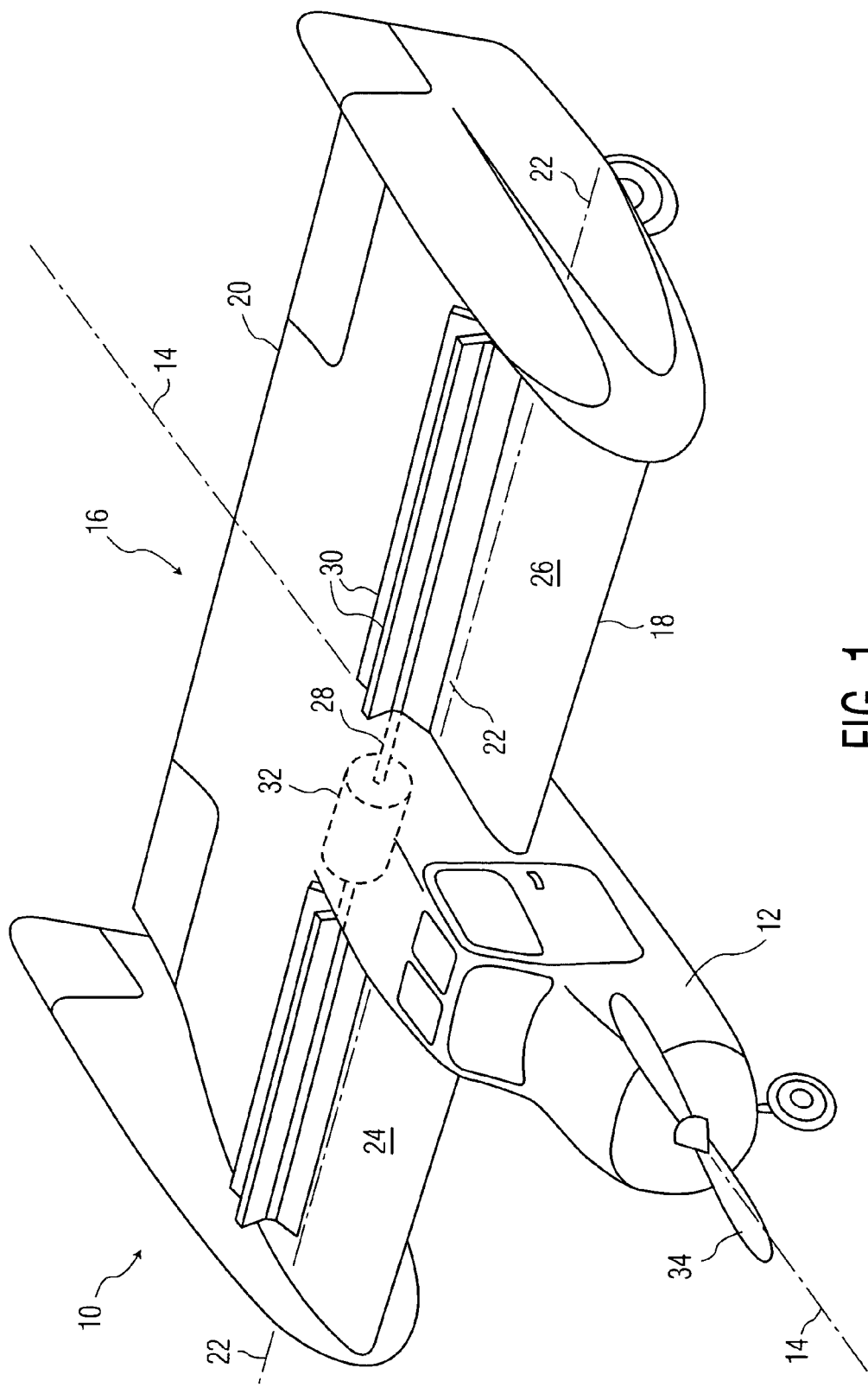
FIG. 1 is a perspective view of an aircraft incorporating a thruster within each wing component, according to a first preferred embodiment of the present invention.
Figure 2:
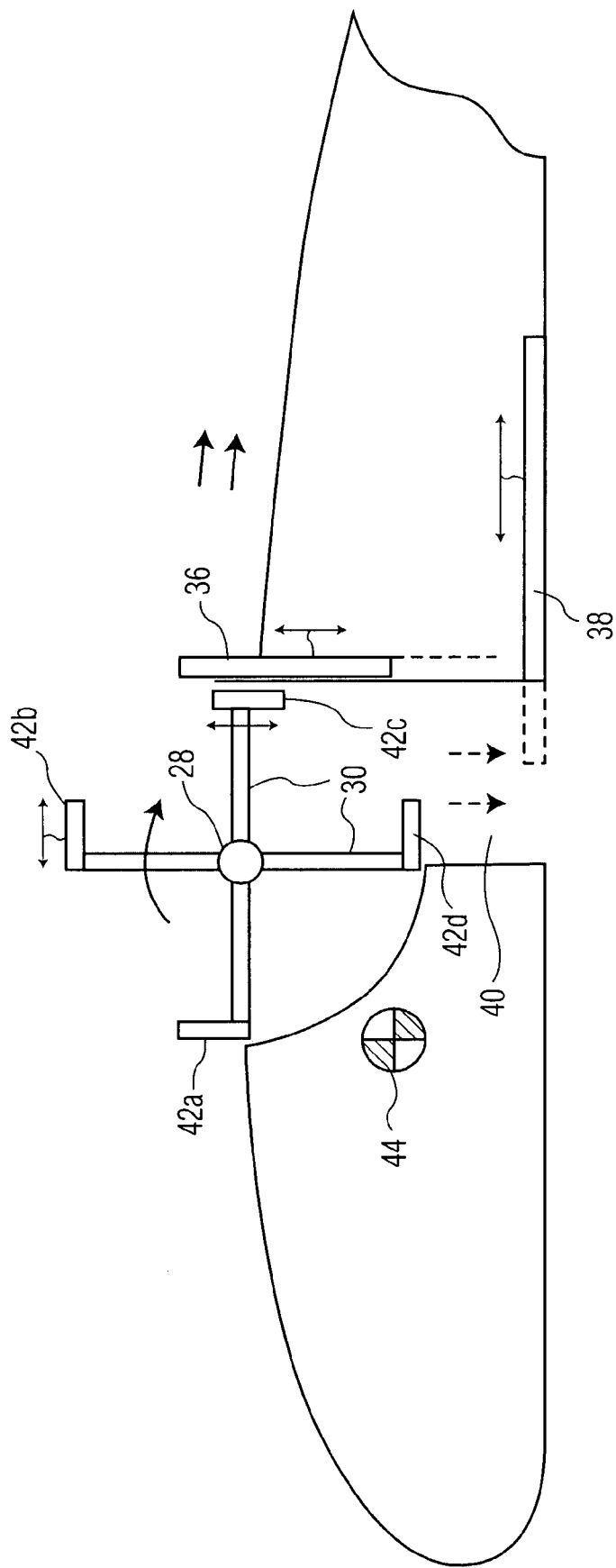
FIG. 2 is a cross sectional view of the wing in the aircraft of FIG. 1, showing details of the thruster and its surrounding shrouds.
Figure 3:
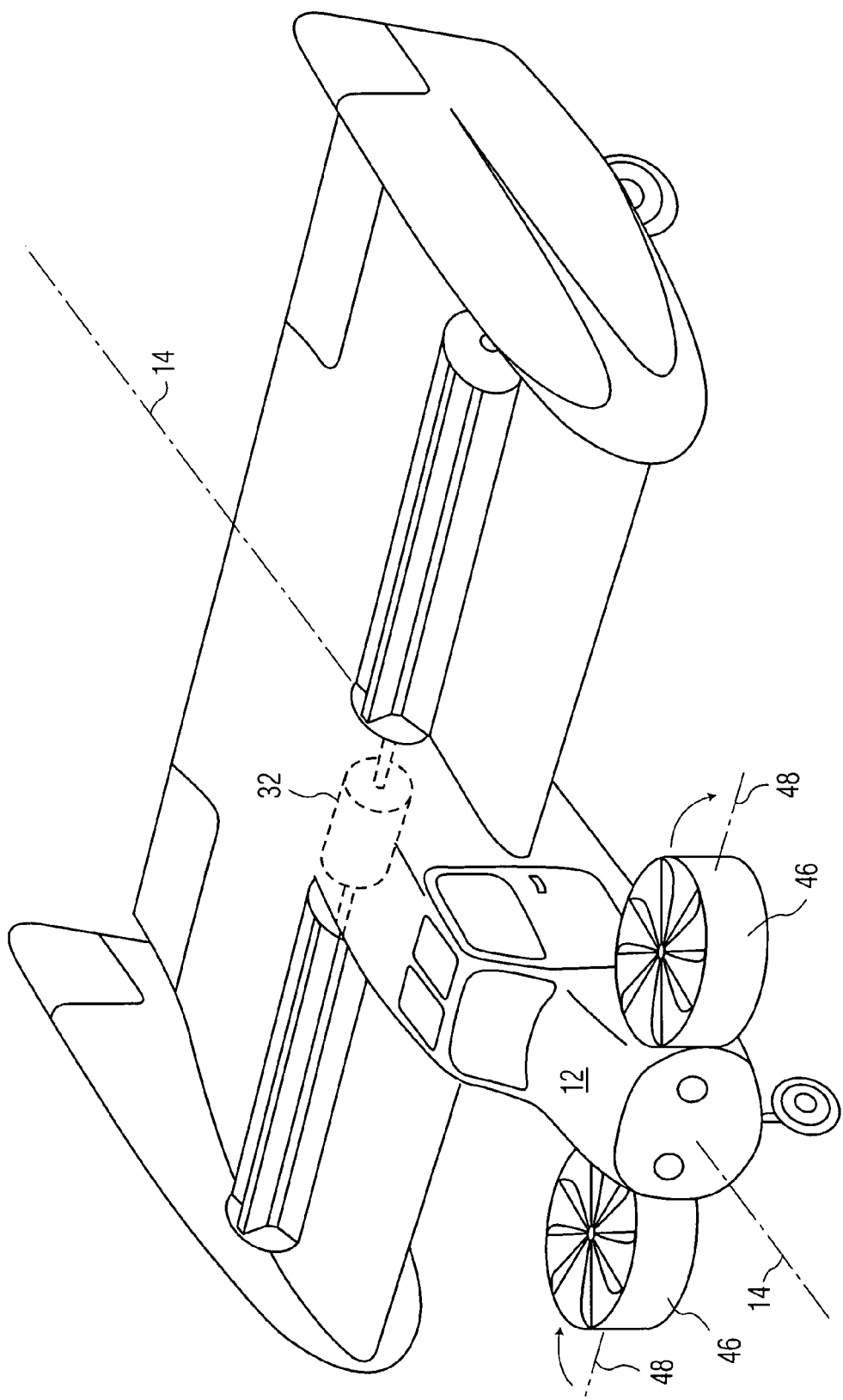
FIG. 3 is a perspective view of an aircraft, according to a second preferred embodiment of the present invention.
Figure 4:
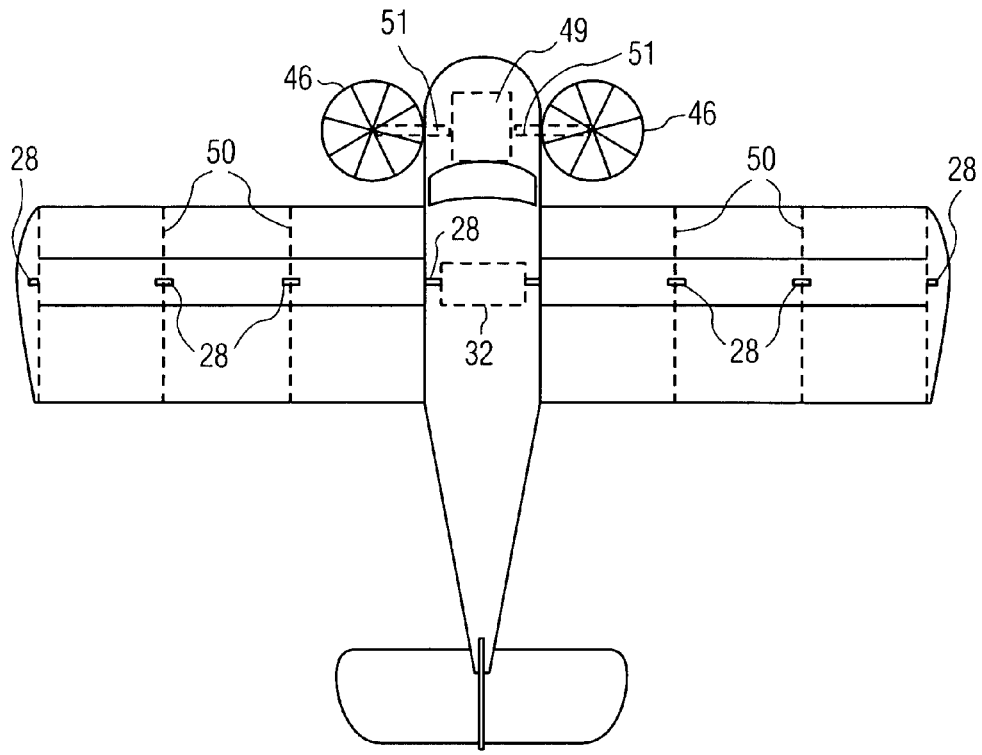
FIG. 4 is a top view of the aircraft of FIG. 3.
Figure 5A:
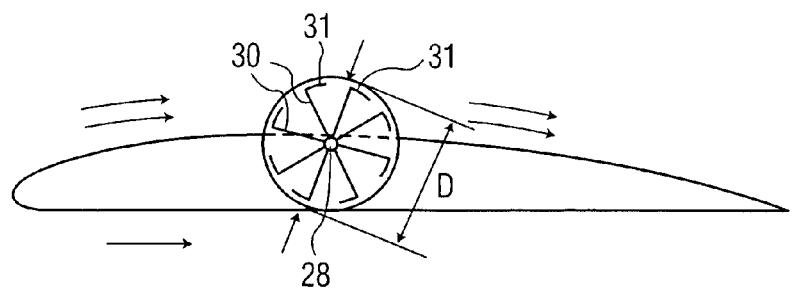

FIG. 5*a* is a cross sectional view of the wing of either the aircraft of FIGS. 1 and 2, or of FIGS. 3 and 4, showing a thruster which speeds the flow of air over the upper surface of the wing.

Figure 5B:
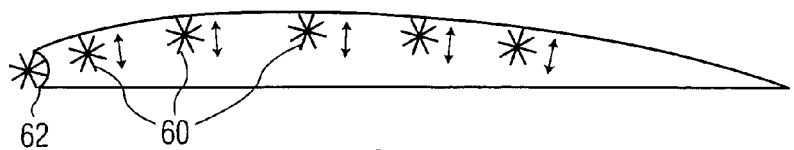

FIG. 5*b* is a cross sectional view of the wing of either the aircraft of FIGS. 1 and 2, or of FIGS. 3 and 4, showing a plurality of thrusters which are moveable into and out of the air stream over the upper surface of the wing.

FIG. 6 is a cross sectional view of an aircraft wing according to an alternative embodiment of the present invention.

Figure 7:
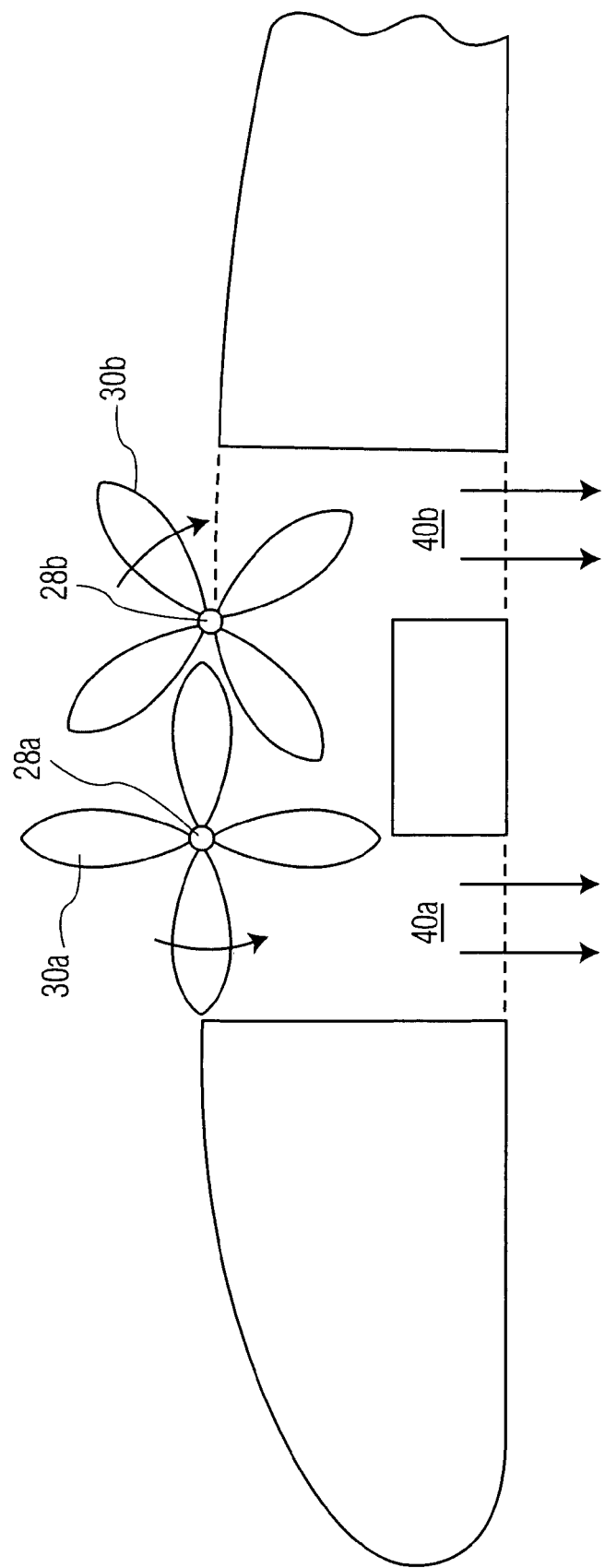

FIG. 7 is a cross sectional view of an aircraft wing according to a further alternative embodiment of the present invention.

Figure 8:
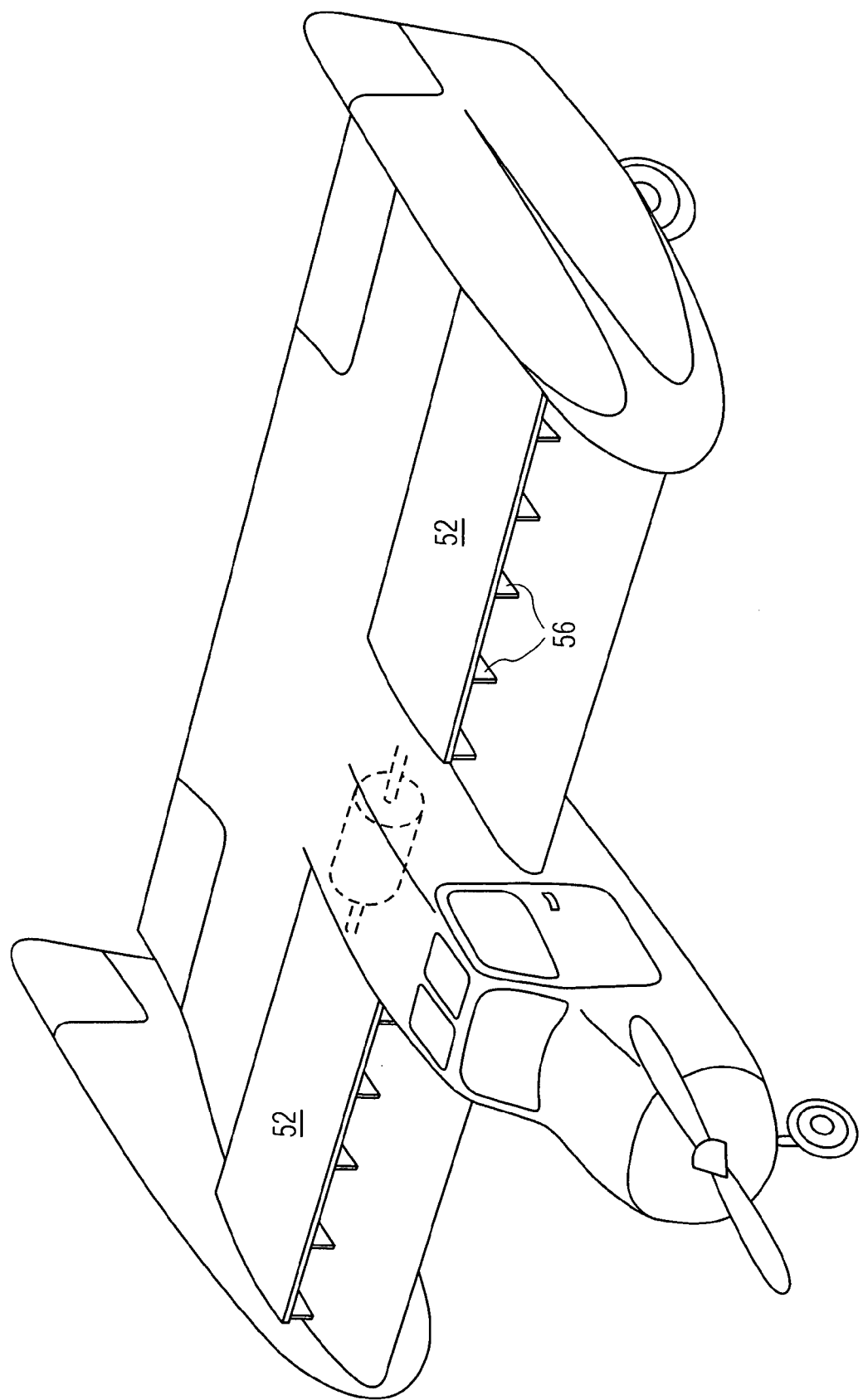

FIG. 8 is a perspective view of an aircraft according to a third preferred embodiment of the present invention.

Figure 9:
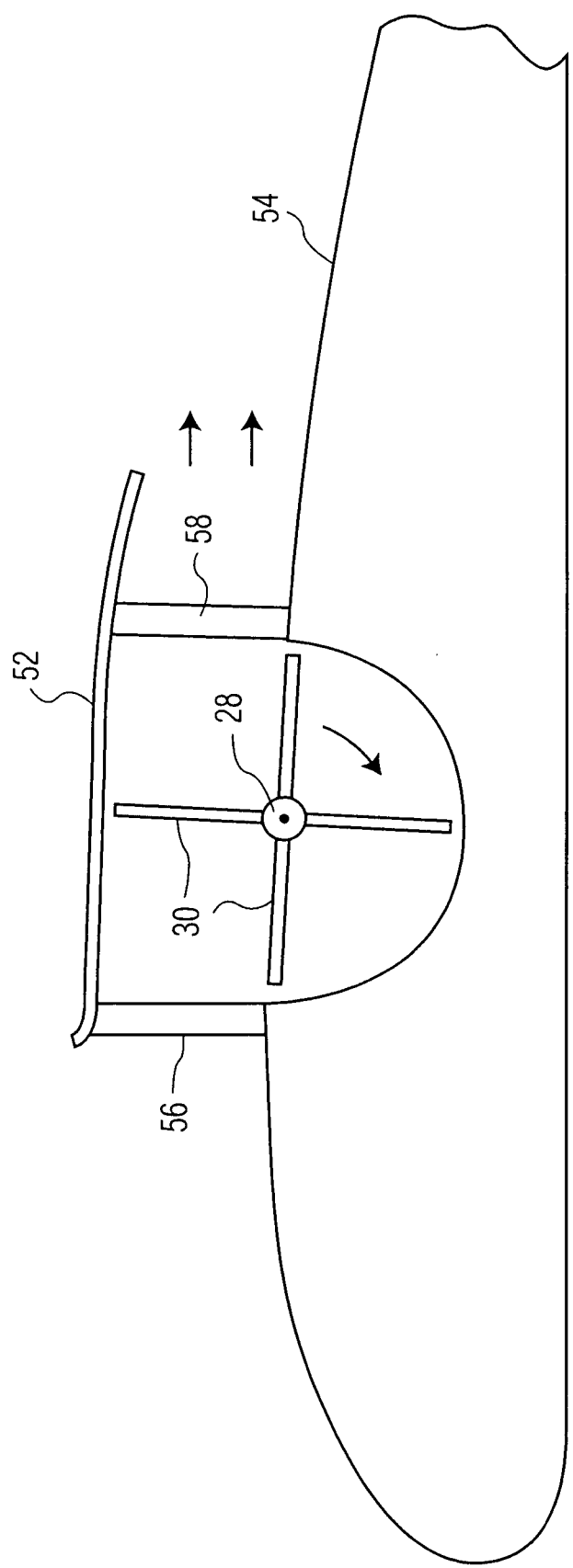

FIG. 9 is a cross-sectional view of the wing of the aircraft of FIG. 8.

DETAILED DESCRIPTION OF THE PREFERRED EMBODIMENTS

The preferred embodiments of the present invention will now be described with reference to FIGS. 1-7 of the drawings. Identical elements in the various figures are designated with the same reference numerals.

FIGS. 1 and 2 of the drawings show a first preferred embodiment of the aircraft according to the present invention.

FIGS. 3 and 4 illustrate a second preferred embodiment, FIGS. 8 and 9 illustrate a third preferred embodiment thereof. The "thruster" incorporated into each wing component of the aircraft is illustrated in the concept diagrams of FIGS. 2, 5a, 5b, 6, 7 and 9. None of these diagrams are drawn to scale.

FIGS. 1 and 2 illustrate a first preferred embodiment of the present invention. This embodiment includes a winged aircraft 10 having an elongate fuselage 12 which extends along the longitudinal axis 14 of the aircraft. The fuselage has a top, bottom and two lateral sides and forms a passenger compartment for at least one person (e.g., the pilot) to be carried by the aircraft.

The aircraft 10 has a fixed wing 16 having a leading edge 18 and trailing edge 20 and a longitudinal wing axis 22 between them extending perpendicular to the longitudinal axis 14 of the aircraft.

The fixed wing is attached to the fuselage and extends outward from the two lateral sides thereof, there being a first wing component 24 extending outward from the right lateral side of the fuselage and a second wing component 26 extending outward from the opposite, left lateral side of the fuselage.

According to the invention, at least one "thruster" is disposed on each wing component to assist in providing vertical lift to the aircraft. This thruster includes a shaft 28, mounted for rotation in the respective wing component and extending substantially parallel to the wing axis 22 and a plurality of fan blades 30 attached to the shaft 28 for movement of air upon rotation of the shaft.

The shaft 28 in each wing component is driven by a prime mover 32 disposed within the fuselage 12. This prime mover may be any type of internal combustion engine or even an electric motor.

The aircraft 10 is propelled forward in a conventional manner by means of a forward mounted engine which drives a propeller 34 at the front of the aircraft.

As is best seen in FIG. 2, the thruster is mounted for rotation within the wing. A first shroud 36 is moveable vertically to direct air either downward, thereby providing vertical lift to the aircraft when the shroud is in an upward position, or rearward over the upper surface of the wing when the shroud is in the lower position.

Similarly, a second shroud 38 arranged on the lower surface of the wing component is moveable between a first, rearward position, in which a downwardly extending channel 40 remains open, or in a second, forward position in which the channel 40 is closed.

The fan blades 30 on the shaft 28 may be provided with moveable tip elements 42 which extend forward in the direction of motion to collect air during the upward and rearward motion of the respective fan blade 30 (elements 42a and 42b) and which are moved rearward of the tip of the respective fan blade 30 as the blade moves downward and forward (elements 42c and 42d). In this way, air may be collected and then directed downward through the channel 40, so that only a minimum of the air will be recycled upward again to the top surface of the wing.

The center of gravity 44 of the aircraft lies in the fuselage between the leading edge 18 and the trailing edge 20 of the wing, and preferably forward of the shaft 28, as shown in FIG. 2.

FIGS. 3 and 4 illustrate a second preferred embodiment of the aircraft according to the invention. In this case, a pair of ducted fan units 46 are arranged on both sides of the fuselage 12 to provide both vertical lift, when the aircraft is operating in a VTOL mode, and forward propulsion for the aircraft when the aircraft is flying forward. The ducted fan units are mounted for rotation about a common axis 48 which, like the wing axis 22, is perpendicular to the central longitudinal axis 14 of the aircraft. The ducted fan units 46 are powered either by a common internal combustion engine 49 arranged in the forward section of the fuselage 12, or powered by separate, independent IC engines disposed within the fan units themselves. When powered by an engine in the fuselage, the ducted fans are driven by rotating shafts 51.

As shown in FIG. 4, the shafts 28, bearing the shaft blades 30, may be mounted for rotation at each wing tip and at points adjacent the fuselage and the engine 32. If additional support is necessary, the fan blades may be interrupted at points along the wing and the shaft 28 supported by internal wing braces 50, shown in dashed lines.

FIGS. 8 and 9 illustrate still another preferred embodiment of the present invention in which the shaft 28 with its rotatable blades 30 are mounted beneath a shroud 52 that constricts the air driven by the fan blades 30 to flow over the upper surface 54 of the wing. The shroud 52 is supported, fore and aft of the shaft 28 and blades 30, by vertically extending braces 56 and 58, respectively.

The "thruster" formed by the engine 32, rotatable shaft 28 and fan blades 30 can assume a number of configurations, as illustrated in FIGS. 5a, 5b, 6 and 7. FIG. 5a shows a single shaft 28, with a plurality of fan blades 30 having forwardly extending tip elements 31. The diameter D of the fan is substantially twice the thickness of the wing. For this purpose, the shaft 28 is mounted substantially at the level of the upper surface of the wing.

FIG. 5b shows an alternative embodiment having a plurality of thrusters (fans) in which the diameter of each fan is less than the thickness of the wing. In this case, the fans are moveable vertically between an upper position, in which the fan blades protrude through closeable openings in the upper surface of the wing (not shown), and a lower position in which the fan blades are wholly contained within the wing. Closeable openings are provided on the upper surface of the wing to allow the fan blades to protrude.

As shown in FIG. 5b, any number of moveable fans 60 may be provided within a wing. Advantageously, an additional fan 62 is provided at the leading edge of the wing to direct incoming air downward to increase the pressure on the lower surface of the wing.

FIGS. 6 and 7 show two alternative embodiments of a thruster which incorporate two horizontal shafts 28a and 28b surrounded by their respective blades 30a and 30b. The forward shaft 28a rotates in such a way that the air received from the upper surface of the wing is accelerated rearward. The second shaft 28b may be either rotated in the same direction as the first shaft 28a, in which case the air is accelerated further in the rearward direction along the upper surface of the wing, or in the opposite direction causing the air to be directed downward through an opening 40 in the wing.

In FIG. 7, the shafts 28a and 28b with their respective fan blades 30a and 30b form a "Roots" type blower which causes the air to be directed downward through two openings 40a and 40b in the wing.

There has thus been shown and described a novel VTOL personal aircraft which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A personal aircraft (PAC) capable of short take-off and landing (STOL) or vertical take-off and landing (VTOL) and having a center of gravity, said aircraft comprising, in combination:
   (a) an elongate fuselage having two lateral sides and forming a passenger compartment, said fuselage being arranged along a longitudinal axis of said aircraft;
   (b) an elongate fixed wing attached to the fuselage for providing vertical lift to the aircraft upon forward motion thereof through the air, said fixed wing having a leading edge, a trailing edge and a longitudinal wing axis between them, said fixed wing extending outward from the two lateral sides of the fuselage with the wing axis substantially perpendicular to said longitudinal axis of the aircraft, the center of gravity of said aircraft being located in a region between the leading edge and the trailing edge of said wing, said wing having a first wing component extending outward from one lateral side of said fuselage and second wing component extending outward from an opposite lateral side of said fuselage; and
   (c) at least one thruster disposed in each wing component, substantially midway between said leading edge and said trailing edge thereof, for providing additional vertical lift to said aircraft whether or not said aircraft is in motion, said thruster comprising:
      (1) at least one shaft mounted for rotation in the respective wing component and extending substantially parallel to said wing axis; and
      (2) a plurality of fan blades attached to each shaft for movement of air upon rotation of the respective shaft, each fan blade having an outer extremity; and
   (d) a prime mover coupled to rotate said at least one shaft in each wing component in such direction that the outer extremities of the fan blades move rearward, toward the trailing edge of the respective wing component, when above the shaft, and move forward, toward the leading edge of the wing component, when below the shaft, thereby causing air to move in a rearward direction above the shaft.

2. The aircraft defined in claim 1, wherein the fan blades are elongate and extend substantially parallel to the shaft to which they are attached.

3. The aircraft defined in claim 1, further comprising a shroud in each wing component, adjacent said fan blades, which directs the air downward, thereby providing vertical lift to said aircraft when said aircraft is in the STOL and VTOL mode.

4. The aircraft defined in claim 3, wherein at least a portion of said shroud is movable, thereby to control the amount of air that is directed downward.

5. The aircraft defined in claim 1, wherein each thruster comprises two shafts mounted for rotation in each wing component, said two shafts being substantially parallel to said wing axis and to each other, each of said two shafts being driven by a common prime mover and having a plurality of fan blades for movement of air.

6. The aircraft defined in claim 5, wherein said two shafts mounted in each wing component are driven in counter rotation by said prime mover.

7. The aircraft defined in claim 6, wherein said two shafts are mounted sufficiently close together such that their respective fan blades are interleaved.

8. The aircraft defined in claim 7, wherein the fan blades are configured to inhibit air from passing between said two shafts, thereby forming a Roots-type blower configuration.

9. The aircraft defined in claim 6, wherein said two shafts are mounted sufficiently far apart such that their respective fan blades are not interleaved.

10. The aircraft defined in claim 9, wherein said two shafts are driven in counter rotation by said prime mover in a direction causing air to be directed downward between said two shafts.

11. The aircraft defined in claim 5, wherein said two shafts mounted in each wing component are driven in the same direction of rotation by said prime mover.

12. The aircraft defined in claim 1, each wing component has an upper wing surface and a lower wing surface, and wherein said at least one shaft is mounted between said upper and lower wing surface of the respective wing component in which it is mounted.

13. The aircraft defined in claim 12, wherein said at least one shaft is mounted closer to said upper wing surface than to said lower wing surface.

14. The aircraft defined in claim 13, wherein said fan blades extend upward beyond said upper wing surface of the respective wing component.

15. The aircraft defined in claim 12, wherein said at least one shaft is moveable in the vertical direction between a first position, in which its associated fan blades protrude upward from the upper surface of its associate wing component, and a second position in which its fan blades are substantially contained between the upper surface and the lower surface of said wing component.

16. The aircraft defined in claim 1, wherein the fan blades extend outward substantially radially from the respective shaft to which they are attached.

17. The aircraft defined in claim 1, wherein each fan blade includes a radial portion which extends outward substantially radially with respect to said shaft and a tip portion which extends in a substantially circumferential direction about said shaft.

18. The aircraft defined in claim 17, wherein said tip is moveable in the circumferential direction with respect to the fan blade to which it is attached.

19. The aircraft defined in claim 1, further comprising a prime mover disposed in the fuselage for rotating both of said shafts simultaneously.

20. The aircraft defined in claim 1, further comprising a substantially vertical fin disposed at the free end of each wing component.

* * * * *